United States Patent
Murphy

(10) Patent No.: US 8,381,179 B2
(45) Date of Patent: Feb. 19, 2013

(54) SYSTEM AND METHOD FOR IDENTIFYING OPPORTUNITIES FOR REFACTORING IN AN OBJECT-ORIENTED PROGRAM

(75) Inventor: PVR Murphy, Bangalore (IN)

(73) Assignee: Siemens Aktiengesellschaft, München (DE)

( * ) Notice: Subject to any disclaimer, the term of this patent is extended or adjusted under 35 U.S.C. 154(b) by 1322 days.

(21) Appl. No.: 12/151,748

(22) Filed: May 8, 2008

(65) Prior Publication Data

US 2008/0288932 A1    Nov. 20, 2008

(30) Foreign Application Priority Data

May 10, 2007 (EP) ..................................... 07009437

(51) Int. Cl.
*G06F 9/44* (2006.01)

(52) U.S. Cl. ....................................... 717/110; 717/100

(58) Field of Classification Search ............ 717/100–110
See application file for complete search history.

(56) References Cited

PUBLICATIONS

Frank Simon, Fank Steinbrockner, Claus Lewerentz; "Metrics Based Refactoring"; IEEE; Proc. 5th European conference on Software Maintenance and Reengineering; 2001; pp. 30-38; Los Alamitos, CA, USA.*

Frank Simon, Fank Steinbrückner, Claus Lewerentz; "Metrics Based Refactoring"; IEEE; Proc. 5th European conference on Software Maintenance and Reengineering; 2001; pp. 30-38; Los Alamitos, CA, USA.

* cited by examiner

*Primary Examiner* — Wei Zhen
*Assistant Examiner* — Brahim Bourzik

(57) ABSTRACT

There is described a technique for rearranging entities in an object oriented program. The proposed technique includes computing a property set for an entity, in a set of entities belonging to classes in said object-oriented program. The next step comprises identifying an entity having a maximum cardinality of the computed property set. From the set of entities, all such entities are identified that satisfy a condition that the ratio of the number of elements in the property set of the identified entity that are in common with the property set of said entity having maximum cardinality to the number of elements in the property set of the identified entity that are not in common with the property set of said entity having maximum cardinality is greater than or equal to a threshold value. A sub-group is formed comprising said entity having maximum cardinality of the computed property along with any identified entity that satisfies said condition.

17 Claims, 1 Drawing Sheet

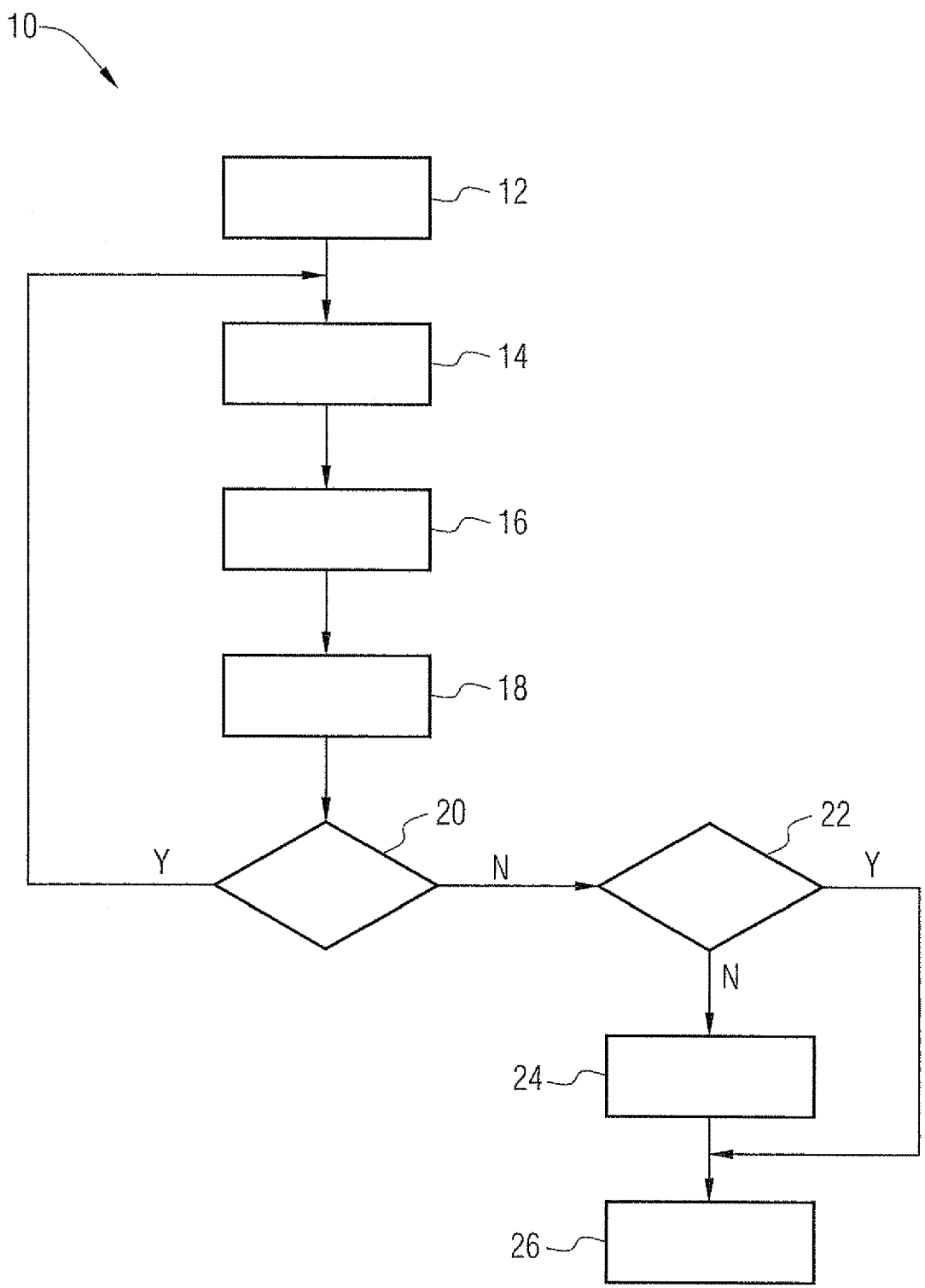

SYSTEM AND METHOD FOR IDENTIFYING OPPORTUNITIES FOR REFACTORING IN AN OBJECT-ORIENTED PROGRAM

CROSS REFERENCE TO RELATED APPLICATIONS

This application claims priority of European Patent Office application No. 07009437.0 EP filed May 10, 2007, which is incorporated by reference herein in its entirety.

FIELD OF INVENTION

The present invention relates to object-oriented programming, and in particular to techniques for enhancing cohesion and reducing coupling in a control program of an industrial automation system.

BACKGROUND OF INVENTION

In object-oriented programming, it is desirable that all the members of a class should be related to each other and less dependent on members of other classes in the program. The former property of an object-oriented program is referred to as 'cohesion', while the latter is referred to as 'coupling.' However, it has been observed by researchers that the above properties, namely high cohesion and low coupling, are not really satisfied by many object-oriented programs in practice. It is important that object-oriented programs satisfy these properties as maintenance and defect detection can become simpler.

Presently, refactoring tools and methods axe known that rely on the user guiding the tool by suggesting explicitly the members of classes to be moved to chosen destination classes, so that the resulting classes may be more cohesive and exhibit less coupling. The refactoring tools provide an automated capability to carry out refactorings such as Move Method or Move Attribute (or field) on the input classes only when the user specifies which method or attribute should be moved from a given source class to a destination class.

For example, the article Simon, F. Steinbruckner, and C. Lewerentz, "Metrics Based Refactoring", Proc. 5th European Conference on Software Maintenance and Reengineering, pages 30-38, IEEE, Los Alamitos, 2001, describes a metrics based refactoring approach.

SUMMARY OF INVENTION

It is an object of the present invention to provide an improved system and method for carrying out refactoring in an object-oriented program.

The above object is achieved by a method for rearranging entities in an object-oriented program, comprising the steps of:

a) computing a property set for an entity, in a set of entities belonging to classes in said object-oriented program, b) identifying an entity having a maximum cardinality of the computed property set, c) from the set of entities, identifying any entity that satisfies a condition that the ratio of the number of elements in the property set of the identified entity that are in common with the property set of said entity having maximum cardinality to the number of elements in the property set of the identified entity that are not in common with the property set of said entity having maximum cardinality is greater than or equal to a threshold value, d) forming a sub-group comprising said entity having maximum cardinality of the computed property along with any identified entity that satisfies said condition, e) removing entities that belong to said sub-group from said set of entities, and f) repeating steps b), c), d) and e) for remaining entities in said set of entities.

The above object is achieved by a system for rearranging entities in an object-oriented program, comprising the steps of:

means for computing a property set for an entity, in a set of entities belonging to classes in said object-oriented program, means for identifying an entity having the highest cardinality of the computed property set, means for identifying any entity, from the set of entities, that satisfies a condition that the ratio of the number of elements in the property set of the identified entity that are in common with the property set of the entity having maximum cardinality to the number of elements in the property set of the identified entity that are not in common with the property set of the entity having maximum cardinality is greater than or equal to a threshold value, and means for forming a sub-group comprising said entity having the highest cardinality of the computed property along with any identified entity that satisfies said condition.

The underlying idea of the present invention is to optimize cohesion and coupling characteristics of an object-oriented program by presenting the user with an alternate set of classes other than the set of classes in the input program to keep methods/attributes that belong together in a class. The proposed technique considers the set of all the fields/attributes and methods in all classes in the user program and generates a list of groups of entities (methods or attributes) that should belong together. Each group containing entities that should belong together forms a class in the refactored program. The principle herein is to keep an attribute/method in a group/class so that the entities in the group/class exhibit high cohesion and low coupling.

In a further embodiment, the proposed method further comprises merging a first sub-group into a second sub-group, wherein said merging is based upon a condition that the number of remote accesses and invocations by an entity of the first sub-group to entities contained in the property set of said entity of the first sub-group reduces when said entity of the first sub-group is moved from the first sub-group to the second sub-group. This feature is advantageous if the size of a sub-group is too small compared to that of other sub-groups formed using the proposed method. The above feature facilitates merging of a smaller sub-group with a larger sub-group so as to reduce coupling.

In a preferred embodiment, the proposed method further comprises refactoring said object-oriented program such that entities of a particular sub-group belong to the same class in the refactored program. The new set of classes obtained after refactoring is applied will exhibit enhanced cohesion and reduced coupling.

In a preferred embodiment, the proposed system belongs to an industrial automation system, said object-oriented program comprises a control program generated by an engineering system of said industrial automation system.

BRIEF DESCRIPTION OF THE DRAWINGS

The present invention is further described hereinafter with reference to illustrated embodiments shown in the accompanying drawing, in which:

sole FIGURE is a flowchart illustrating a method of rearranging entities in an object-oriented program,

DETAILED DESCRIPTION OF INVENTION

In the context of the present discussion, the term 'cohesion' refers to a property that represents the extent to which members of a class are related to each other, while the term 'coupling' refers to a property that represents the extent to which members of a class are dependent on members of other classes in the program. Further, as would be familiar to one skilled in the art, the term 'entity' is used to refer any method or attribute/field in an object-oriented program.

The embodiments described below provide a technique that considers the set of all the fields/attributes and methods in all classes in the user program and generates a list of groups of entities (methods or attributes) that should belong together. That is, given an object-oriented program having classes $C_1 \ldots C_n$ including method definitions and declaration of attributes, an automatic method is proposed that presents the user or designer with a possible rearrangement of methods and attributes into m subgroups or classes satisfying the property below. The proposed rearrangement of methods and attributes into different classes is achieved by refactoring techniques like 'move method' and 'move attribute.' Each of the new sub-groups or classes has, as its members, methods or attributes, that have a high cohesion measure and a low coupling measure. In comparison with the initial set of classes $C_1 \ldots C_n$, the new set of classes after refactorings are applied will exhibit enhanced cohesion and lower coupling. The proposed algorithm, referred to as a partitioning algorithm, suggests a design level refactoring that partitions program into classes independent of the set of classes in the input program.

FIGURE shows all exemplary embodiment of a method 10 for rearranging entities of an object-oriented program using a partitioning technique. As shown, the method 10 starts at step 12 by forming a set of entities belonging to classes in the object-oriented program and computing a property set for each entity. The property set for an entity x is computed by the function p(x), wherein p(x) is defined as below:
p(x), if x is a method={x, all directly used methods, all directly used attributes},
p(x), if x is an attribute={x, all methods using it}.

For example, consider a program having a pattern of accesses as shown below

```
Class A
    a1,a2;          // fields
    mA1: b1,b2      //  definition of method mA1 that refers to
                        fields b1, b2 of some other class B
        invokes mA2 // mA1 calls mA2
    mA2: a1,a2      //  definition of method mA2 that refers to a1,
                        a2 and calls method mC3 of class C
        invokes C:mC3
Class B
    b1,b2
    mB1: c1,c2
        invokes mB2
    mB2: b1,b2
        invokes A:mA2
Class C
    c1,c2
    mC1: a1,a2
        invokes mc2
    mC2: c1,c2
        invokes B:mB2
    mC3: c1
```

Referring back to FIGURE, step 12 of the proposed method computes the property set p(e) for each entity e, as shown in table 1 below.

TABLE 1

| Entity | p(e) (arranged in decreasing order of cardinality of p(Entity)) |
|---|---|
| mA1 | {mA1, mA2, b1, b2} |
| mA2 | {mA2, mC3, a1, a2} |
| mB1 | {c1, c2, mB1, mB2} |
| mB2 | {b1, b2, mA2, mB2} |
| mC1 | {a1, a2, mC1, mC2} |
| mC2 | {c1, c2, mB2, mc2} |
| c1  | {c1, mC2, mc3} |
| a1  | {a1, mA2} |
| a2  | {a2, mA2} |
| b1  | {b1, mB2} |
| b2  | {b2, mB2} |
| c2  | {c2, mC2} |
| mc3 | {c1, mc3} |

The next step 14 involves identifying an entity having a maximum cardinality of the computed property set. That is, an entity e (method or attribute) is selected for which the cardinality |p(e)| is the maximum. In the present example, the method mA1 is selected at step 14.

Step 16 involves identifying any entity e' that satisfies a condition that the ratio of number of elements in the property set of the identified entity e' that are in common with the property set of the entity e having maximum cardinality to the number of elements in the property set of the identified entity e' that are not in common with the property set of the entity e having maximum cardinality is greater than a threshold value. In an exemplary embodiment, step 16 comprises identifying any entity e' such that the following mathematical condition represented by relationship (1) below is satisfied:

$$|p(e) \cap p(e')|/|p(e') - p(e)| > \text{a threshold value}$$

or $$p(e') \text{ is a subset of } p(e) \quad (1)$$

Any entity e' which satisfies the above condition is grouped with the entity e to form a sub-group. The threshold value is typically chosen to be unity, but may be greater than unity. This value (greater than 1) may be specified by a user depending upon the extent of partitioning desired by the user. Further, instead of a '>' condition, a user may wish to use a '>=' condition in order to avoid creating more classes/groups in the refactored program than is necessary.

In the example presented herein, mB2 satisfies the above condition, so it is grouped with mA1. A check is made to ascertain if there are any other entries in table 1 which satisfy the above condition either with respect to mA1 or mB2. As can be seen, b1 and b2 satisfy the condition with respect to mB2 and are hence grouped with the sub-group associated with A1. There are no other entities in table 1 that satisfy the above condition.

Hence sub-group associated with mA1 comprises {mA1, mB2, b1, b2}.

At step 18, the entities of the obtained sub-group, ie, mA1, mB2, b1 and b2 are removed from consideration from the set of entities shown in table 1. Next at step 20, a check is made to determine if there are any entities remaining in the set. If there are entities remaining in the set, control returns to step 14, wherein the entity having the next highest cardinality of the property set is selected.

In the present example, the next entity that satisfies the maximum cardinality property is mA2. According to relationship (1) above a1 and a2 are grouped with mA2 as p(a1) and p(a2) are subsets of p(mA2) at step 16

Hence the sub-group associated with mA2 comprises {mA2, a1, a2}.

At step 18, the entities of the sub-group associated with mA2, i.e., mA2, a1, a2 are removed from the set of entities in table 1.

For the remaining entities, control returns to step 14, wherein the next entity that satisfies the maximum cardinality property is identified as mB1.

At step 16, mC2 is grouped with mB1 as it satisfies the condition given by relationship (1). Further, each one of c1 and c2 are grouped with mB1 as they satisfy the property with respect to mC2. Further still, mc3 is grouped with mB1 as it satisfies the condition with respect to c1.

Hence the subgroup associated mB1 comprises {mB1, mC2, c1, c2, mC3}). At step 18, the entities of this sub-group are removed from the set of entities in table 1.

For the remaining entity mC1, control once again returns to step 14. However, as can be seen, since there are no further remaining entities, the sub-group associated with mC1 merely comprises {mC1}.

Subsequently, at step 20, since no entities remain in the set of entities, control moves to step 22, wherein the sub-groups determined by the proposed method are suggested to the user. If at step 22, the user accepts the partitioned sub-groups, the method proceeds to step 26 wherein refactorings are carried on the object-oriented program such that that entities of a particular sub-group belong to the same class in the refactored program. That is, each class in the refactored program shall have entities (method and/or attributes) contained in a particular sub-group determined by the partitioning method described above. Step 26 is typically implemented using a sequence of 'move method' and/or 'move attribute' refactorings.

However, at step 22, a user may choose not to accept the possible refactorings suggested by the method. This may happen if size of a sub-group is too small compared to that of other sub-groups formed using the proposed method. For example, in the present example, the sub-group {mC1} comprises only a single entity and the user may wish to merge the same with a larger sub-group. In such a case, the control moves to step 24 that involves merging of a smaller sub-group with a larger sub-group so as to reduce coupling.

In the illustrated embodiment, the merging at step 24 is based upon a condition that the number of remote accesses and invocations by an entity of the first (smaller) sub-group to entities contained in the property set of said entity of the first sub-group reduces when said entity of the first sub-group is moved from the first sub-group to the second sub-group. For example, in the illustrated embodiment, we have {mC1} as an independent sub-group and {mA1, mB2, b1, b2}, {mA2, a1, a2}, {mB1, mC2, c1, c2 mC3} as the other sub-groups.

p(mC1)={a1, a2, mC1, mC2} and {a1, a2} is a subset of the sub-group {mA2, a1, a2}.

If mC1 is an independent sub-group, we will have two remote accesses a1 and a2 as against one (remote) method invocation if we had {mC1} merged with the sub-group {mA2, a1, a2}. Hence the proposed method may suggest a merger of {mC1} with the sub-group {mA2, a1, a2}. User feedback may be taken at the time of merging.

Example 1

For the sample program represented as program 1 below, the proposed method works as follows:

Program 1

```
class ClassA {
    public int attributeA1;
    public int attributeA2;
    public int attributeA3;
    private ClassB b;
    public ClassA( ){
        b = new ClassB( );
    }
    public void methodA1( ) {
        attributeA1=0;
        methodA2( );
    }
    public void methodA2( ) {
        b.attributeB1 = 0;
        b.attributeB2 = 0;
        b.methodB2( );
    }
    public void methodA3( ) {
        attributeA1 = 0;
        attributeA2 = 0;
        methodA1( );
        methodA2( );
    }
}
class ClassB {
    public int attributeB1;
    public int attributeB2;
    private ClassA a;
    public ClassB( ){
        a = new ClassA( );
    }
    public void methodB1( ) {
        a.attributeA1 = 0;
        a.attributeA2 = attributeB1;
        a.attributeA2 = 0;
        a.attributeA3 = 0;
        a.methodA1( );
    }
    public void methodB2( ) {
        attributeB1 = 0;
        attributeB2 = a.attributeA3;
    }
    public void methodB3( ) {
        attributeB1 = a.attributeA3;
        methodB2( );
    }
}
class ClassC {
    public int attributeC1;
    private ClassB b;
    private ClassA a;
    public ClassC( ) {
        a = new ClassA( );
        b = new ClassB( );
    }
    public void methodC1 ( ) {
        b.methodB1( );
        a.attributeA1 = 0;
    }
    public void methodC2 ( ) {
        methodC1( );
        attributeC1 = 0;
    }
}
```

For the above program, the table of property sets for each attribute and method of each class is shown in table 2 below:

TABLE 2

| Attribute/method | P set |
|---|---|
| MethodA1 | {attributeA1, methodA1, methodA2} |
| MethodA2 | {methodB2, attributeB1, attributeB2, methodA2} |
| MethodA3 | {attributeA1, attributeA2, methodA1, methodA2, methodA3} |
| MethodB1 | {attributeA1, attributeA2, attributeB1, attributeA3, methodA1, methodB1} |
| MethodB3 | {attributeB1, attributeA3, methodB2, methodB3} |
| MethodC1 | {methodB1, attributeA1, methodC1} |
| MethodC2 | {methodC2, methodC1, attributeC1} |
| AttributeA1 | {attributeA1, methodA1, methodA3, methodB1, methodC1} |
| AttributeA2 | {methodA3, methodB1, attributeA2} |
| AttributeA3 | {attributeA3, methodB1, methodB3} |
| AttributeC1 | {attributeC1, methodC2} |
| AttributeB1 | {methodA2, methodB1} |
| AttributeB2 | {methodA2, methodB2} |

Applying the proposed technique, we obtain the following groups that contain members that belong together or maintain a good balance between cohesion and coupling as explained above:

Class 1 or Class A:

{methodA3, methodB1, methodA1, methodC1, attributeA1, attributeA2, attributeA3}

Class 2 or class B:

{methodA2, methodB3, attributeB1, attributeB2, methodB2}

Class 3 or class C:

{attributeC1, methodC2}

The resulting refactored program is presented below as program 2.

```
Program 2 class ClassA {
    public int attributeA1;
    public int attributeA2;
    public int attributeA3;
    private ClassB b;
    public ClassA( ){
        b = new ClassB( );
    }
    public void methodA1( ) {
        attributeA1=0;
        methodA2( );
    }
    public void methodB1( ) {
        attributeA1 = 0;
        attributeA2 = b.attributeB1;
        attributeA2 = 0;
        attributeA3 = 0;
        methodA1( );
    }
    public void methodC1 ( ) {
        methodB1( );
        attributeA1 = 0;
    }
    public void methodA2( ) {
        b.methodA2( );
    }
    public void methodA3( ) {
        attributeA1 = 0;
        attributeA2 = 0;
```

```
Program 2 methodA1( );
        methodA2( );
    }
}
class ClassB {
    public int attributeB1;
    public int attributeB2;
    private ClassA a;
    public ClassB( ){
        a = new ClassA( );
    }
    public void methodA2( ) {
        attributeB1 = 0;
        attributeB2 = 0;
        methodB2( );
    }
    public void methodB1( ) {
        a.methodB1( );
    }
    public void methodB2( ) {
        attributeB1 = 0;
        attributeB2 = a.attributeA3;
    }
    public void methodB3( ) {
        attributeB1 = a.attributeA3;
        methodB2( );
    }
}
class ClassC {
    public int attributeC1;
    private ClassB b;
    private ClassA a;
    public ClassC( ) {
        a = new ClassA( );
        b = new ClassB( );
    }
    public void methodC1 ( ) {
        a.methodC1( );
    }
    public void methodC2 ( ) {
        methodC1( );
        attributeC1 = 0;
    }
}
```

In all the above illustrated embodiments, movement of a method from a class hierarchy or to a class hierarchy may be dealt with by method of handling inheritance, which may be illustrated as follows. Consider classes P, Q and R such that Q is derived from the base class P and R derived from Q and a method m in class P that is inherited by Q and R. If the method m is low-cohesive in classes P, Q and R, the entire inheritance hierarchy, and the method is not overridden and there exists a destination class to which method m may be moved, to improve cohesion and reduce coupling, then method m may be moved from the entire class hierarchy to the identified destination class.

Method m may be low-cohesive in class P and highly cohesive in the classes Q and R and m is not overridden in Q and R, in such a case, the movement of method m can break the source class hierarchy. The user should be informed and only if the user intends to give priority enhancing cohesion and reduce coupling even if a class hierarchy may be broken, should the tool carry out the movement of method m from the class where it is low-cohesive.

When a low-cohesive member needs to be moved to a class participating in an inheritance hierarchy and the destination class is not the bottom most in the hierarchy, it is necessary to inform the user and accept his or her suggestion regarding the movement of the member into the class participating in an inheritance hierarchy.

The proposed technique allows designers and developers to ensure that their design or code exhibits high cohesion and low coupling. Ensuring that classes in a program have a high cohesion and low coupling ensures identification of defects becomes simpler. Otherwise, if a class has too many dependencies with other classes, pinpointing where the fault or defect is can be time consuming. Furthermore, it is easier to make enhancements to designs or code that exhibit high cohesion and low coupling.

The proposed partitioning algorithm is not biased by the choice of the classes in the input program and takes a completely independent look at the user program. In the case of the partitioning algorithm, it can so happen that if the input program has n classes, the refactored program may have m classes where m!=n. The partitioning algorithm concerns itself only with the problem of maintaining a good balance between cohesion and coupling and in the process actually carries out a higher level design refactoring and not just a sequence of move methods and move fields. The techniques described have been attempted on large object-oriented programs and they point out sequences of move method refactorings to the user that are effective in improving cohesion and lowering coupling.

The proposed technique will find applications in various software projects where design and development is object-oriented, using any of the programming languages such as C++, Java or C#. The proposed technique is advantageous in applications such as industrial automation, particularly in programmable industrial automation systems for controlling and/or adjusting automation processes or plants. Such systems generally comprise what is known as a runtime system for runtime sequence control of an automation component (machine or system), as well as what is referred to as an engineering system to create and edit control programs intended for execution in the runtime system. In many applications, the control programs generated by the engineering system are object-oriented, wherein, the proposed technique provides a useful means for enhancing cohesion and reducing coupling in such control programs.

Summarizing, the present invention deals with a technique for rearranging entities in an object oriented program. The proposed technique includes computing a property set for an entity, in a set of entities belonging to classes in said object-oriented program. The next step comprises identifying an entity having a maximum cardinality of the computed property set. From the set of entities, all such entities are identified that satisfy a condition that the ratio of the number of elements in the property set of the identified entity that are in common with the property set of said entity having maximum cardinality to the number of elements in the property set of the identified entity that are not in common with the property set of said entity having maximum cardinality is greater than or equal to a threshold value. A sub-group is formed comprising said entity having maximum cardinality of the computed property along with any identified entity that satisfies said condition.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the spirit or scope of the present invention as defined.

The invention claimed is:

1. A method for rearranging entities in an object-oriented program, comprising the steps of:
    computing a property set for an entity, in a set of entities belonging to classes in said object-oriented program, wherein the property set is defined by a function p(x), where x represents one of the entities and:
    if x is a method, then p(x)={x, all directly used methods, all directly used attributes};
    if x is an attribute, then p(x)={x, all methods using x};
    identifying an entity having a maximum cardinality of the computed property set, wherein the cardinality of a property set is the number of the above-bracketed properties in the property set;
    from the set of entities, identifying any entity that satisfies a relation:

$|p(e) \cap p(e')|/|p(e')-p(e)| \geq$ threshold; wherein, $|p(e) \cap p(e')|$ is number of elements in the property set of the identified entity that are in common with the property set of said entity having maximum cardinality; and
    $|p(e')-p(e)|$ is the number of elements in the property set of the identified entity that are not in common with the property set of said entity having maximum cardinality;
    forming a sub-group comprising said entity having maximum cardinality of the computed property along with any identified entity that satisfies said condition; and
    removing entities that belong to said sub-group from said set of entities.

2. The method according to claim 1, further comprising merging a first sub-group into a second sub-group, wherein said merging is based upon a second condition that the number of remote accesses and invocations by an entity of the first sub-group to entities contained in the property set of said entity of the first sub-group reduces when said entity of the first sub-group is moved from the first sub-group to the second sub-group.

3. The method according to claim 1, further comprising refactoring said object-oriented program such that entities of a particular sub-group belong to the same class in the refactored program.

4. The method according to claim 3, wherein said object-oriented program comprises a control program generated by an engineering system of an industrial automation system.

5. A method for rearranging entities in an object-oriented program, comprising the steps of:
    a) computing a respective property set for each entity in a set of entities belonging to classes in said object-oriented program,
    wherein each respective property set is defined by a function p(x), where x represents one of the entities and:
    if x is a method, then p(x)={x, all directly used methods, all directly used attributes};
    if x is an attribute, then p(x)={x, all methods using x};
    b) identifying an entity having a maximum cardinality of the computed property set, wherein the cardinality of a property set is the number of the above-bracketed properties in the property set;
    c) from the set of entities, identifying any entity that satisfies a relation:

$|p(e) \cap p(e')|/|p(e')-p(e)| \geq$ threshold;

Wherein
    $|p(e) \cap p(e')|$ is number of elements in the property set of the identified entity that are in common with the property set of said entity having maximum cardinality; and

|p(e')−p(e)| is the number of elements in the property set of the identified entity that are not in common with the property set of said entity having maximum cardinality;

d) forming a sub-group comprising said entity having maximum cardinality of the computed property along with any identified entity that satisfies said condition;

e) removing entities that belong to said sub-group from said set of entities; and f) repeating steps b), c), d) and e) for remaining entities in said set of entities; and g) automatically generating a list of the formed sub-groups of the entities.

6. The method according to claim 5, further comprising merging a first sub-group into a second sub-group, wherein said merging is based upon a second condition that the number of remote accesses and invocations by an entity of the first sub-group to entities contained in the property set of said entity of the first sub-group reduces when said entity of the first sub-group is moved from the first sub-group to the second sub-group.

7. The method according to claim 5, further comprising refactoring said object-oriented program such that entities of a particular sub-group belong to the same class in the refactored program.

8. The method according to claim 5, wherein said object-oriented program comprises a control program generated by an engineering system of an industrial automation system.

9. A system for rearranging entities in an object-oriented program, comprising:
a processor;
a memory;
a computing device for computing a property set for an entity, in a set of entities belonging to classes in said object-oriented program, wherein the property set is defined by a function p(x), where x represents one of the entities and:
if x is a method, then p(x)={x, all directly used methods, all directly used attributes};
if x is an attribute, then p(x)={x, all methods using x};
an identifier to identify an entity having the highest cardinality of the computed property set, wherein the cardinality of a property set is the number of the above-bracketed properties in the property set; and
from the set of entities, identifying any entity that satisfies a relation:

$$|p(e) \cap p(e')|/|p(e')-p(e)| \geq \text{threshold};$$

Wherein
|p(e)∩p(e')| is number of elements in the property set of the identified entity that are in common with the property set of said entity having maximum cardinality; and
|p(e')−p(e)| is the number of elements in the property set of the identified entity that are not in common with the property set of said entity having maximum cardinality;
a sub-group forming device for forming a sub-group comprising said entity having the highest cardinality of the computed property along with any identified entity that satisfies said condition.

10. The system according to claim 9, further comprising means for refactoring said object-oriented program such that entities of a particular sub-group belong to the same class in the refactored program.

11. The system according to claim 9, wherein said system belongs to an industrial automation system and wherein said object-oriented program comprises a control program generated by an engineering system of said industrial automation system.

12. The system according to claim 10, wherein said system belongs to an industrial automation system and wherein said object-oriented program comprises a control program generated by an engineering system of said industrial automation system.

13. The method according to claim 1, wherein the computing step further comprises computing a respective property set for each entity in the set, and entering the entities and respective property sets into a table ordered by cardinality of the respective property set of each entity; wherein the removing step comprises removing the entities that belong to said sub-group from the table; and further comprising the steps of:

a) if any entities remain in the table after the removing step then identifying a next entity with maximum cardinality among the remaining entities in the table;

b) if any other of the remaining entities satisfy said condition with respect to said next entity then repeating the forming and removing steps on the next entity and said other entities and then repeating the method from step a) of this claim; and c) automatically generating a list of the sub-groups of the entities.

14. The method according to claim 13, further comprising the steps of:
if no further entities remain in the table that satisfy said condition with respect to said next entity then identifying any final entities remaining in the table as respective independent sub-groups; and
merging one of the independent sub-groups into one of the sub-groups of the forming step if a number of remote accesses and invocations by an entity of said one independent sub-group to entities contained in the property set of said entity of said one independent sub-group is reduced when said entity of said one independent sub-group is moved from said one independent sub-group to said one of the sub-groups of the forming step;
wherein the program is partitioned into a second set of classes independent of said classes in the object-oriented program.

15. The method according to claim 5 wherein step a) further comprises entering the entities and the respective property sets into a table ordered by cardinality of the respective property set of each entity; wherein step e) comprises removing the entities that belong to said sub-group from the table; and step f) comprises:
if any entities remain in the table after step e) then identifying a next entity with maximum cardinality among the remaining entities, and if any of the remaining entities satisfy said condition with respect to said next entity having maximum cardinality then repeating steps d), e), and f) until no remaining entities satisfy said condition.

16. The method according to claim 15, further comprising the steps of:
if no further entities remain in the table that satisfy said condition with respect to said next entity then identifying any final entities remaining in the table as respective independent sub-groups; and
merging one of the independent sub-groups into one of the sub-groups created by the forming step if a number of remote accesses and invocations by an entity of the independent sub-group to entities contained in the property set of said entity of the independent sub-group is reduced when said entity of the independent sub-group is moved from the independent sub-group to said one of the sub-groups created by the forming step.

17. The method according to claim 15, wherein after step d) if there are any other entries in the table that satisfy said condition with respect to said identified entity, then grouping said any other entries in said sub-group associated with said identified entity and removing said any other entries from the table.

* * * * *

UNITED STATES PATENT AND TRADEMARK OFFICE
CERTIFICATE OF CORRECTION

PATENT NO. : 8,381,179 B2
APPLICATION NO. : 12/151748
DATED : February 19, 2013
INVENTOR(S) : PVR Murphy It is certified that error appears in the above-identified patent and that said Letters Patent is hereby corrected as shown below:

In the Claims:

In claim 3, col. 10, line 38, please remove [[3. The method according to claim 1,]] and insert --3. The method according to claim 2,--.

Signed and Sealed this
Ninth Day of July, 2013

Teresa Stanek Rea
*Acting Director of the United States Patent and Trademark Office*